(12) United States Patent
Hakewill et al.

(10) Patent No.: US 10,747,539 B1
(45) Date of Patent: Aug. 18, 2020

(54) SCAN-ON-FILL NEXT FETCH TARGET PREDICTION

(71) Applicant: Apple Inc., Cupertino, CA (US)

(72) Inventors: James Robert Howard Hakewill, Los Gatos, CA (US); Constantin Pistol, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 15/350,486

(22) Filed: Nov. 14, 2016

(51) Int. Cl.
*G06F 9/30* (2018.01)
*G06F 9/38* (2018.01)
*G06F 12/0875* (2016.01)

(52) U.S. Cl.
CPC ........ *G06F 9/3802* (2013.01); *G06F 9/30058* (2013.01); *G06F 9/30145* (2013.01); *G06F 9/382* (2013.01); *G06F 12/0875* (2013.01); *G06F 2212/452* (2013.01)

(58) Field of Classification Search
CPC .. G06F 9/3005; G06F 9/30058; G06F 9/3802; G06F 9/3804; G06F 9/382; G06F 9/30145; G06F 12/0875
See application file for complete search history.

(56) References Cited

U.S. PATENT DOCUMENTS

| 5,093,778 | A | 3/1992 | Favor et al. |
| 5,574,871 | A | 11/1996 | Hoyt et al. |
| 5,604,877 | A | 2/1997 | Hoyt et al. |
| 5,732,272 | A | 3/1998 | Gochee |
| 5,740,415 | A | 4/1998 | Hara |
| 5,758,142 | A | 5/1998 | McFarling et al. |
| 5,768,576 | A | 6/1998 | Hoyt et al. |
| 5,805,876 | A * | 9/1998 | Bose ..................... G06F 9/3804 712/216 |
| 5,822,575 | A | 10/1998 | Tran |

(Continued)

FOREIGN PATENT DOCUMENTS

| CN | 101763248 A | 6/2010 |
| EP | 1513062 A1 | 3/2005 |

OTHER PUBLICATIONS

International Search Report and Written Opinion in International Application No. PCT/US2006/028196, dated Jan. 8, 2007, 16 pages.

(Continued)

*Primary Examiner* — Benjamin P Geib
(74) *Attorney, Agent, or Firm* — Kowert Hood Munyon Rankin and Goetzel PC; Rory D. Rankin

(57) ABSTRACT

Systems, apparatuses, and methods for instruction next fetch prediction. A scan-on-fill target predictor in a processor generates a predicted next fetch address for the instruction fetch unit. When a group of instructions is used to fill an instruction cache but is not currently being retrieved from the instruction cache for processing by other pipeline stages, the group of instructions are scanned to identify exit points of basic blocks within the group. An entry of a table in the scan-on-fill target predictor is allocated for an instruction in a basic block in the group when the basic block has an exit point with a target address that can be resolved within a single clock cycle. The scan-on-fill target predictor may perform a lookup of the table with the current fetch address. The prediction may be compared to a main branch predictor at a later pipeline stage for training purposes.

20 Claims, 8 Drawing Sheets

(56) References Cited

U.S. PATENT DOCUMENTS

| | | | |
|---|---|---|---|
| 5,845,323 | A | 12/1998 | Roberts et al. |
| 5,848,433 | A | 12/1998 | Tran et al. |
| 5,850,543 | A | 12/1998 | Shiell et al. |
| 5,881,278 | A | 3/1999 | Tran et al. |
| 5,928,358 | A | 7/1999 | Takayama et al. |
| 5,935,238 | A | 8/1999 | Talcott et al. |
| 5,964,868 | A | 10/1999 | Gochman et al. |
| 6,016,533 | A | 1/2000 | Tran |
| 6,073,230 | A | 6/2000 | Pickett et al. |
| 6,115,810 | A | 9/2000 | Patel et al. |
| 6,134,649 | A * | 10/2000 | Witt ............... G06F 9/30021 711/E12.043 |
| 6,138,213 | A | 10/2000 | McMinn |
| 6,151,671 | A | 11/2000 | D'Sa et al. |
| 6,170,054 | B1 | 1/2001 | Poplingher |
| 6,269,436 | B1 | 7/2001 | Tran et al. |
| 6,314,514 | B1 | 11/2001 | McDonald |
| 6,374,349 | B1 | 4/2002 | McFarling |
| 6,553,488 | B2 | 4/2003 | Yeh et al. |
| 6,647,490 | B2 | 11/2003 | Keller et al. |
| 6,721,877 | B1 | 4/2004 | Chen et al. |
| 6,792,502 | B1 | 9/2004 | Pandya et al. |
| 6,912,648 | B2 | 6/2005 | Hammarlund et al. |
| 7,320,066 | B2 | 1/2008 | Yokoi |
| 7,523,298 | B2 | 4/2009 | Gschwind |
| 7,590,830 | B2 * | 9/2009 | Chaudhry ............. G06F 9/3806 712/239 |
| 7,836,290 | B2 | 11/2010 | Chaudhry et al. |
| RE42,466 | E | 6/2011 | Yokoi |
| 8,959,320 | B2 * | 2/2015 | Beaumont-Smith ........................ G06F 9/3848 712/239 |
| 9,405,544 | B2 | 8/2016 | Holman et al. |
| 9,529,595 | B2 * | 12/2016 | Lin ............... G06F 9/3804 |
| 2003/0120906 | A1 | 6/2003 | Jourdan et al. |
| 2003/0149865 | A1 | 8/2003 | Kadambi |
| 2003/0212882 | A1 | 11/2003 | Bonanno et al. |
| 2004/0225870 | A1 | 11/2004 | Srinivasan et al. |
| 2005/0050278 | A1 | 3/2005 | Meier et al. |
| 2006/0036837 | A1 | 2/2006 | Stark et al. |
| 2006/0095895 | A1 | 5/2006 | Sudheer |
| 2006/0218385 | A1 | 9/2006 | Smith et al. |
| 2007/0239974 | A1 | 10/2007 | Park et al. |
| 2008/0301420 | A1 | 12/2008 | Inoue |
| 2009/0125707 | A1 | 5/2009 | Olson et al. |
| 2011/0016292 | A1 | 1/2011 | McDonald et al. |
| 2012/0017214 | A1 | 1/2012 | Shannon et al. |
| 2013/0151823 | A1 | 6/2013 | Beaumont-Smith et al. |
| 2014/0075156 | A1 | 3/2014 | Blasco-Allue et al. |
| 2014/0344558 | A1 | 11/2014 | Holman et al. |

OTHER PUBLICATIONS

Powell, et al., "Reducing Set-Associative Cache Energy via Way-Prediction and Selective Direct-Mapping", Proceedings of the 34th Annual ACM/IEEE International Symposium on Microarchitecture, Dec. 2001, pp. 54-65, IEEE Computer Society, Washington, D.C., USA.

Skadron, et al., "Improving Prediction for Procedure Returns with Return-Address-Stack Repair Mechanisms", Proceedings of the 31st Annual ACM/IEEE International Symposium on Microarchitecture, Nov. 1998, pp. 259-271, IEEE Computer Society Press, Los Alamitos, CA, USA.

Extended European Search Report in European Application No. 12185670.2, dated Mar. 14, 2013, 10 pages.

Loh, Gabriel H., "Revisiting the Performance Impact of Branch Predictor Latencies", IEEE International Symposium on Performance Analysis of Systems and Software, Mar. 19, 2006, pp. 59-69.

Office Action in Japanese Patent Application No. 2012-230298, dated Dec. 4, 2013, 26 pages.

Gao, Hongliang, "Improving Branch Prediction Accuracy via Effective Source Information and Prediction Algorithms", Doctoral Dissertation, University of Central Florida, Dec. 2008, 113 pages.

Loh, Gabriel Hsiuwei, "Microarchitecture for Billion-Transistor VLSI Superscalar Processors", Doctoral Dissertation, Yale University, Dec. 2002, 268 pages.

International Search Report and Written Opinion in International Application No. PCT/US2012/056983, dated Dec. 17, 2012, 13 pages.

Office Action in Korean Patent Application No. 10-2012-109481, dated Oct. 28, 2013, 5 pages.

Final Office Action in Japanese Patent Application No. 2012-230298, dated Jun. 11, 2014, 11 pages.

Notification of the First Office Action in Chinese Application No. 201210543904.X, dated Nov. 4, 2014, 32 pages.

Reconsideration Report in Japanese Patent Application No. 2012-230298, dated Nov. 12, 2014, 15 pages.

Efthymiou et al., "An Adaptive Serial-Parallel CAM Architecture for Low-Power Cache Blocks", Proceedings of the 2002 International Symposium on Low Power Electronics and Design, Aug. 12-14, 2002, pp. 136-141.

Pistol, Constantin, U.S. Appl. No. 15/002,171, entitled "Next Fetch Predictor", filed Jan. 20, 2016, 41 pages.

Non-Final Office Action in U.S. Appl. No. 15/002,171, dated Nov. 16, 2017, 19 pages.

Final Office Action in U.S. Appl. No. 15/002,171, dated Jun. 6, 2018, 24 pages.

Final Office Action in U.S. Appl. No. 15/002,171, dated Jun. 6, 2019, 36 pages.

Non-Final Office Action in U.S. Appl. No. 15/002,171, dated Oct. 18, 2018, 23 pages.

Reinman et al., "Using a Serial Cache for Energy Efficient Instruction Fetching", Journal of Systems Architecture, Nov. 2004, pp. 675-685, vol. 50, Issue 11.

* cited by examiner

Fetched Group of Instructions 200

| Fetch Group Address (205) | Instruction Offset (210) | Instruction Type (215) | Exit Instruction Offset (220) | Target Address Indication (225) |
|---|---|---|---|---|
| 0x04A8 | 0 | Non-Branch | 3 | Unknown |
| 0x04A8 | 1 | Non-Branch | 3 | Unknown |
| 0x04A8 | 2 | Non-Branch | 3 | Unknown |
| 0x04A8 | 3 | Unconditional indirect branch, R0 | 3 | Unknown |
| 0x04A8 | 4 | Non-Branch | 7 | Target-A |
| 0x04A8 | 5 | Non-Branch | 7 | Target-A |
| 0x04A8 | 6 | Non-Branch | 7 | Target-A |
| 0x04A8 | 7 | Conditional direct branch, Target-A | 7 | Target-A |
| 0x04A8 | 8 | Non-Branch | 11 | Target-B |
| 0x04A8 | 9 | Non-Branch | 11 | Target-B |
| 0x04A8 | 10 | Non-Branch | 11 | Target-B |
| 0x04A8 | 11 | Conditional direct branch, Target-B | 11 | Target-B |
| 0x04A8 | 12 | Non-Branch | 14 | RAS pop |
| 0x04A8 | 13 | Non-Branch | 14 | RAS pop |
| 0x04A8 | 14 | Call-return | 14 | RAS pop |
| 0x04A8 | 15 | Non-Branch | Fall Through | 0x04A8 + Line Width = 0x04A8+15+1 |

FIG. 2

SCAN-ON-FILL NEXT FETCH TARGET PREDICTION

BACKGROUND

Technical Field

Embodiments described herein relate to the field of processors and more particularly, to instruction next fetch prediction mechanisms.

Description of the Related Art

Modern processors typically include multiple pipeline stages that facilitate execution of program instructions. Execution may begin at an initial stage in which an instruction fetch unit retrieves instructions from memory using a register commonly referred to as a program counter or PC. In many instances, the PC value is the address of an instruction in memory. As an instruction fetch unit retrieves instructions from memory, the instruction fetch unit may increment the PC value by an instruction width multiplied by some number of instructions. This PC value may also be altered when control transfer instructions are executed such as conditional branch instructions, call instructions, return instructions, jump instructions, etc.

A variety of instruction control flow predictors, such as branch predictors, are used to predict the next target address to fetch from memory to allow the processor to fetch ahead of the control transfer instructions. If the predictions are correct, subsequent instructions to execute may already be preloaded into the processor's pipeline. Correct prediction may enhance performance (e.g., execution time), as compared to fetching the instructions after executing each control transfer instruction. Furthermore, the subsequent instructions may be speculatively executed and thus may be ready to retire/commit results when the control transfer instruction is resolved (if the prediction is correct), which may further enhance performance.

While successful program flow predictions increase performance, the control flow predictors providing the predictions use a significant amount of time and information. In order to provide relatively fast, such as single-cycle, predictions for the next instruction fetch address, next fetch predictors are used. Although they may be trained by the control flow predictors, the next fetch predictors use relatively limited storage and simpler logic compared with the control flow predictors. Further challenges arise when multiple instructions are fetched simultaneously in fetch groups during each clock cycle. A fetch group may include multiple control transfer instructions, which can have multiple target addresses.

Typically, the address used for the next fetch is generated before any instruction data is received from the last fetch of one or more instructions. Hence, predictions are made based on a history of instruction fetch addresses. The fact that the one or more instructions may have needed to be prefetched suggests that they have not been recently executed. Due to limited storage in the next fetch predictors, program flow information for instructions that have not been recently executed is unlikely to be present in the next fetch predictors. Therefore, a successful instruction prefetch may be followed by a next fetch predictor misprediction. This misprediction incurs costs in both performance and power as the processor flushes speculative instructions and speculative state and performs recovery.

SUMMARY

Systems, apparatuses, and methods for instruction next fetch prediction are contemplated.

In various embodiments, a processor includes an instruction fetch unit and a scan-on-fill target predictor. The scan-on-fill target predictor generates an indication of a target address to be used to indicate a next fetch address for the instruction fetch unit. The instruction fetch unit fetches a next group of instructions from an instruction cache based on the next fetch address. The indication of the target address may be a target address or an indication that the target address is located in a return address stack. In various embodiments, the scan-on-fill target predictor includes a table of entries storing fetch addresses and corresponding indications of target addresses. When the scan-on-fill target predictor receives a current fetch address used to fetch instructions from the instruction cache, the scan-on-fill target predictor determines whether the address corresponds to an instruction previously scanned by the scan-on-fill target predictor. For example, the scan-on-fill target predictor may perform a lookup of the table for the indication of the target address using the received current fetch address. A hit in the table may be used to select the indication of the target address stored in the entry as the next fetch address to send to the instruction fetch unit.

When the scan-on-fill target predictor determines a group of instructions is used to fill the instruction cache and the group of instructions is not currently being retrieved from the instruction cache to be processed by other pipeline stages of the processor, the scan-on-fill target predictor may scan the group of instructions to identify control transfer instructions within the group. The scan-on-fill target predictor may use the identified control transfer instructions to also identify basic blocks. In order to allocate an entry in the table for a given instruction in the group, in some embodiments, the scan-on-fill target predictor determines whether the given instruction is the first instruction in a basic block. In addition, the scan-on-fill target predictor determines whether an indication of the target address for the exit point can be resolved within a given amount of time. In some embodiments, the given amount of time is a single clock cycle.

In various embodiments, the processor also includes one or more next fetch predictors. The predicted next fetch address from these next fetch predictors has higher priority over the indication of the target address from the scan-on-fill target predictor. However, when the next fetch predictors do not have a prediction, but the scan-on-fill target predictor does provide the indication of the target address, the indication of the target address is chosen as the predicted next fetch address.

The branch predictor in the processor determines a prediction in a later pipeline stage. The branch predictor may be more accurate than the next fetch predictors and the scan-on-fill target predictor. The branch predictor may train the next fetch predictors and the scan-on-fill target predictor. If the prediction from the branch predictor matches the prediction from the scan-on-fill target predictor, then the table entry information in the scan-on-fill target predictor corresponding to the prediction is removed from scan-on-fill target predictor and placed in one or more next fetch predictors. If the prediction from the branch predictor does not match the prediction from the scan-on-fill target predictor, then the table entry information in the scan-on-fill target predictor may be invalidated.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 2 is a block diagram of one embodiment of a fetched group of instructions.

Figure 1:
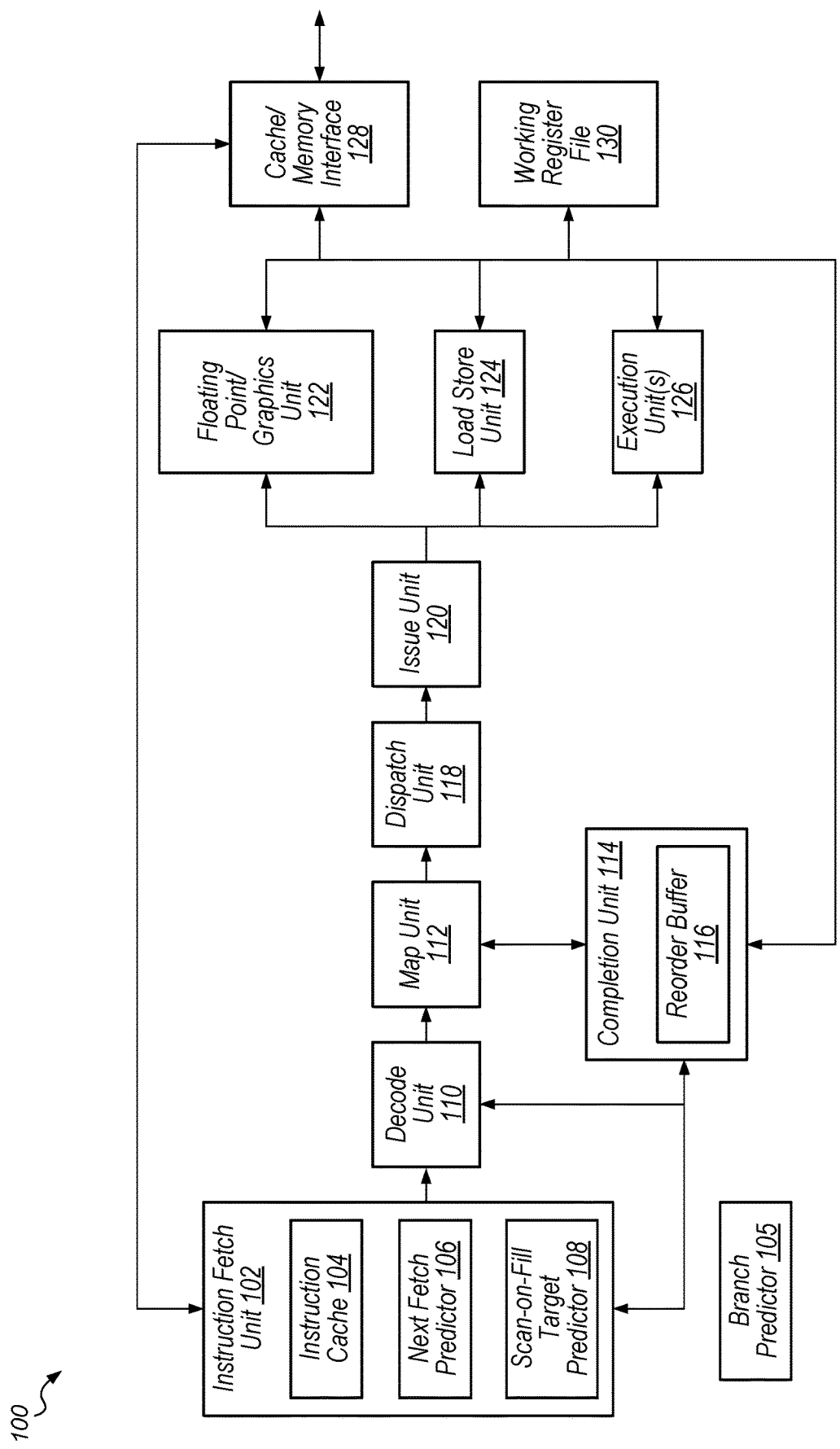
FIG. 1 is a block diagram of one embodiment of a pipeline of a processor.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram illustrating one embodiment of a pipeline of a processor 100 is shown. In various embodiments, the logic of processor 100 may be included in one or more of cores of a central processing unit (CPU). Processor 100 includes instruction fetch unit (IFU) 102 which includes an instruction cache 104, next fetch predictor 106 and scan-on-fill predictor 108. IFU 102 may also include a number of data structures in addition to those shown, such as a branch predictor, a return address stack, an instruction translation lookaside buffer (ITLB), instruction buffers, and/or other structures configured to store state that is relevant to thread selection and processing (in multi-threaded embodiments of processor 100).

IFU 102 is coupled to an instruction processing pipeline that begins with a decode unit 110 and proceeds in turn through a map unit 112, a dispatch unit 118, and issue unit 120. Issue unit 120 is coupled to issue instructions to any of a number of instruction execution resources including execution unit(s) 126, a load store unit (LSU) 124, and/or a floating-point/graphics unit (FGU) 122. These instruction execution resources are coupled to a working register file 130. Additionally, LSU 124 is coupled to cache/memory interface 128. Reorder buffer 116 is coupled to IFU 102, decode unit 110, working register file 130, and the outputs of any number of instruction execution resources. It is noted that the illustrated embodiment is merely one example of how processor 100 may be implemented. Alternative configurations and variations are possible and contemplated.

In one embodiment, IFU 102 may be configured to fetch instructions from instruction cache 104 and buffer them for downstream processing. The IFU 102 may also request data from a cache or memory through cache/memory interface 128 in response to instruction cache misses, and predict the direction and target of control transfer instructions (e.g., branches). It is noted that throughout this disclosure, the terms "control transfer instruction" and "branch instruction" may be used interchangeably. Additionally, while the term "branch instruction" or (or more briefly, "branch") may be used throughout this disclosure, it should be understood that the term applies to any type of control transfer instruction that may be utilized in an instruction set architecture.

The instructions that are fetched by IFU 102 in a given clock cycle may be referred to as a fetch group, with the fetch group including any number of instructions, depending on the embodiment. Each of the next fetch predictor 106 and the scan-on-fill target predictor 108 may generate a prediction for a next fetch address at an early stage of the pipeline. In various embodiments, the predicted next fetch address may be verified later in the pipeline by comparison to a prediction from a branch predictor (not shown). Each of the next fetch predictor 106 and the scan-on-fill target predictor 108 may generate predictions at the granularity of fetch groups (which include multiple instructions and potentially multiple branch instructions). However, the branch predictor may generate predictions at the granularity of individual branch instructions. In the case of a misprediction by next fetch predictor 106, the front-end of pipeline stages of processor 100 may be flushed and fetches may be restarted at the new address.

The branch predictor may be more accurate than the next fetch predictor 106 and the scan-on-fill target predictor 108.

For example, the branch predictor may have more time to generate a prediction, such as more than a single clock cycle. In addition, compared to the next fetch predictor 106 and the scan-on-fill target predictor 108, the branch predictor may have more logic and more on-die real estate for tables and other data structures used for storage of information.

In various embodiments, the predicted next fetch address from the next fetch predictor 106 has higher priority than the predicted next fetch address from the scan-on-fill target predictor 108. Each of the next fetch predictor 106 and the scan-on-fill target predictor 108 may generate a respective predicted next fetch address based on receiving a current fetch address used to fetch instructions from the instruction cache. The predicted next fetch address from the scan-on-fill target predictor 108 may only be used to fetch instructions from the instruction cache when the next fetch predictor 106 does not generate a prediction. If the prediction from the branch predictor in a later pipeline stage matches the prediction from the scan-on-fill target predictor 108 generated in the earlier pipeline stage, then the information used in the scan-on-fill target predictor 108 corresponding to the prediction is removed from scan-on-fill target predictor 108 and placed in the next fetch predictor 106. If the prediction from the branch predictor does not match the prediction from the scan-on-fill target predictor 108, then the information in the scan-on-fill target predictor 108 corresponding to the prediction may be invalidated.

Each fetch group may include up to 'N' instructions, wherein 'N' may vary from embodiment to embodiment and from fetch group to fetch group, and wherein 'N' is a positive integer. Some fetch groups may include more than one branch instruction, resulting in the fetch group having multiple potential targets. Any of various different techniques may be utilized to disambiguate between the multiple branches in a fetch group. For example, in one embodiment, next fetch predictor 106 may include a dual-tag table structure which includes a fetch address tag and a branch history tag for each entry of the table so as to disambiguate between the multiple branches in a fetch group. Each entry of the table may also include a prediction of the next fetch address.

In some embodiments, the scan-on-fill target predictor 108 includes a table structure which also includes a fetch address tag. The fetch address tag may correspond to a particular instruction in the group, such as an entry point to a basic block. A basic block in a software program is a sequence of consecutive program instructions with no branches into the sequence of instructions except to the entry point and no branches out of the sequence of instructions except at the exit point. Typically, compilers decompose software programs into basic blocks as an early analysis step. Control flow graphs typically include basic blocks as nodes.

Instead of having a second tag, the table structure in the scan-on-fill target predictor 108 includes an indication of a target address corresponding to the instruction at the exit point of the basic block. In various embodiments, the instruction at the exit point is a control transfer instruction such as a branch instruction. The target address stored in the table structure is the target address of the instruction at the exit point. An entry of the table structure in the scan-on-fill target predictor 108 may only be allocated to store the fetch address tag of the entry point and the target address of the exit point when the target address can be resolved within a given amount of time. For example, the given amount of time may be a single clock cycle.

In one embodiment, when next fetch predictor 106 receives a current fetch address, next fetch predictor 106 performs a lookup of the fetch address tag field of its table using the current fetch address. In various embodiments, at the same time, the scan-on-fill target predictor 108 also performs a lookup of the fetch address tag field of its table using the current fetch address. If the lookup in the next fetch predictor 106 results in a hit to a single entry, then the prediction from the hit entry in the next fetch predictor 106 is selected to be conveyed to IFU 102. The IFU 102 uses the selected prediction as the next fetch address.

If the lookup in the next fetch predictor 106 results in hits to multiple entries, then next fetch predictor 106 may compare the branch history tags of the multiple matching entries to find the entry which matches the current branch history of processor 100. The prediction from the matching entry may then be selected to be provided to IFU 102. The IFU 102 uses the selected prediction as the next fetch address. If the lookup in the next fetch predictor 106 results in a miss, but the lookup in the scan-on-fill target predictor 108 results in a hit, then the prediction from the hit entry in the scan-on-fill target predictor 108 is selected to be conveyed to IFU 102. The IFU 102 uses the selected prediction as the next fetch address. If the lookup in the next fetch predictor 106 results in a miss and the lookup in the scan-on-fill target predictor 108 results in a miss, then IFU 102 may utilize a fall through as the next fetch address.

IFU 102 may convey fetched instruction data to decode unit 110. In one embodiment, decode unit 110 may be configured to prepare fetched instructions for further processing. Decode unit 110 may be configured to identify the particular nature of an instruction (e.g., as specified by its opcode) and to determine the source and destination registers encoded in an instruction, if any. Map unit 112 may be configured to map the decoded instructions (or uops) to physical registers within processor 100. Map unit 112 may also implement register renaming to map source register addresses from the uops to the source operand numbers identifying the renamed source registers. Dispatch unit 118 may be configured to dispatch uops to reservation stations (not shown) within the various execution units.

Issue unit 120 may be configured to provide instruction sources and data to the various execution units for picked (i.e., scheduled or dispatched) instructions. In one embodiment, issue unit 120 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor 100 includes a working register file 130 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 120 may proceed to one or more of the illustrated execution units to be performed. In one embodiment, each of execution unit(s) 126 is similarly or identically configured to perform certain integer-type instructions defined in the implemented ISA, such as arithmetic, logical, and shift instructions. In some embodiments, architectural and non-architectural register files are physically implemented within or near execution unit(s) 126. It is contemplated that in some embodiments, processor 100 may include any number of integer execution units, and the execution units may or may not be symmetric in functionality.

Load store unit (LSU) 124 may be configured to process data memory references, such as integer and floating-point load and store instructions and other types of memory reference instructions. LSU 124 may include a data cache (not shown) as well as logic configured to detect data cache misses and to responsively request data from a cache or memory through cache/memory interface 128. In one embodiment, a data cache in LSU 124 may be configured as a set-associative, write-through cache in which all stores are written to a higher-level (e.g., L2) cache regardless of whether they hit in the data cache.

In various embodiments, LSU 124 may implement a variety of structures configured to facilitate memory operations. For example, LSU 124 may implement a data TLB to cache virtual data address translations, as well as load and store buffers configured to store issued but not-yet-committed load and store instructions for the purposes of coherency snooping and dependency checking. LSU 124 may include a miss buffer configured to store outstanding loads and stores that cannot yet complete, for example due to cache misses. In one embodiment, LSU 124 may implement a store queue configured to store address and data information for stores that have committed, in order to facilitate load dependency checking. LSU 124 may also include hardware configured to support atomic load-store instructions, memory-related exception detection, and read and write access to special-purpose registers (e.g., control registers).

Floating-point/graphics unit (FGU) 122 may be configured to perform and provide results for certain floating-point and graphics-oriented instructions defined in the implemented ISA. For example, in one embodiment FGU 122 implements single-precision and double-precision floating-point arithmetic instructions compliant with the IEEE floating-point standards, such as add, subtract, multiply, divide, and certain transcendental functions.

In the illustrated embodiment, completion unit 114 includes reorder buffer (ROB) 116 and coordinates transfer of speculative results into the architectural state of processor 100. Entries in ROB 116 may be allocated in program order. Completion unit 114 may include other elements for handling completion/retirement of instructions and/or storing history including register values, etc. In some embodiments, speculative results of instructions may be stored in ROB 116 before being committed to the architectural state of processor 100, and confirmed results may be committed in program order. Entries in ROB 116 may be marked as completed when their results are allowed to be written to the architectural state. Completion unit 114 may also be configured to coordinate instruction flushing and/or replaying of instructions. It is noted that processor 100 may include other components and interfaces not shown in FIG. 1.

Referring to FIG. 2, a generalized block diagram illustrating one embodiment of a fetched group of instructions 200 is shown. As shown, the fetch width is 16 as the integer N for the group of instructions 200 is 16. There are 16 instructions with respective offsets from 0 to 15 as shown in the instruction offset field 210. However, as described earlier, the number of instructions in the fetched group of instructions 200 may vary. Although fields 205-225 are shown, the information shown for the fetched group of instructions 200 is used to describe the characteristics and the parameters of the fetched group of instructions 200. The fields 205-225 may be used by the scan-on-fill target predictor. For example, the scan-on-fill target predictor may scan the fetched group of instructions 200 and determine whether to store information for one or more instructions for later next fetch predictions.

In the illustrated embodiment, the fetch address 205 is the hexadecimal value 04A8. The "0x" in the address indicates a hexadecimal value. In some embodiments, the fetched group of instructions 200 is an entire cache line stored in the instruction cache. In other embodiments, the fetched group of instructions 200 is a portion of a cache line stored in the instruction cache.

As shown, the first three instructions of the fetched group of instructions 200 are non-branch instruction types as indicated in the instruction type field 215. For example, they are not control transfer instructions. The first three instructions correspond to the offsets 0 to 2 in the instruction offset field 210. For example, the first non-branch instruction is located at the address 0x04A8, which is the sum of the address 0x04A8 and the offset 0. The second non-branch instruction is located at an address that is the sum of the address 0x04A8 and the offset 1, which is the address 0x04A9. Similarly, the third non-branch instruction is located at an address that is the sum of the address 0x04A8 and the offset 2, which is the address 0x04AA.

The offsets in the instruction offset field 210 may correspond to any of a number of instruction bytes. The instruction sizes may be 32 bytes, 64 bytes and so forth. Here, the offset corresponds to same sized instructions. Therefore, each increment of an offset in the instruction offset field 210 corresponds to a same number of bytes to a next contiguous instruction of the fetched group of instructions 200. However, in other embodiments, variable-sized instructions may be used and an instruction size may be indicated along with the offset in order to indicate an associated address.

The exit instruction field 220 indicates a respective offset to an exit point of a basic block. As described earlier, a basic block in a software program is a sequence of consecutive instructions with no branches into the basic block except to the entry point and no branches out of the basic block except at the exit point. Typically, compilers decompose software programs into basic blocks as an early analysis step. Control flow graphs typically include basic blocks as nodes. In the example shown, the first instruction with an offset of 0 is in a basic block of 3 instructions with an exit at the unconditional indirect branch instruction at offset 3.

Each of the three instructions in the above basic block has the offset 3 as an exit instruction offset in the field 220. Similarly, each of the instructions corresponding to instruction offsets 4-6 in the instruction offset field 210 is in a basic block of 3 instructions with an exit at the conditional direct branch instruction corresponding to instruction offset 7 in field 210. Each of the three instructions in this basic block has the offset 7 as an exit instruction offset in the field 220.

Each of the three instructions corresponding to instruction offsets 8-10 in the instruction offset field 210 is in a basic block with an exit at the conditional direct branch instruction at offset 11. Each of these three instructions has the offset 7 as an exit instruction offset in the field 220. Each of the two instructions corresponding to instruction offsets 12-13 in the instruction offset field 210 is in a basic block with an exit at the function call return at offset 14. Each of these two instructions has the offset 14 as an exit instruction offset in the field 220. The non-branch instruction corresponding to instruction offset 15 in the instruction offset field 210 does not have an exit point from a basic block within the fetched group of instructions 200. Rather, the exit point for this instruction is the fall through to the next fetch group of instructions.

As shown, the direct branch instructions corresponding to offsets 7 and 11 in the instruction offset field 210 have known target addresses. The target address for the direct branch instruction corresponding to offset 7 is the contents of the program counter (PC), which is 0x04A8+7 or 0x04AF, summed with an address offset encoded in the direct branch instruction. This target address is denoted as Target-A in the target address indication field 225. Similarly, the target address for the direct branch instruction corresponding to offset 11 is the contents of the PC, which is 0x04A8+11 or 0x04B3, summed with an address offset encoded in the direct branch instruction. This target address is denoted as Target-B in the target address indication field 225.

Although the direct branch instructions shown in the fetched group of instructions 200 are conditional, it is noted that an unconditional direct branch instructions would also have a target address that is the contents of the program counter summed with an address offset encoded in the direct branch instruction. The function call return instruction corresponding to offset 14 in the instruction offset field 210 also has a known target address. The target address for this instruction is the contents of the return address stack (RAS). The target addresses is denoted as RAS pop in the target address indication field 225.

The target addresses for direct branch instructions (conditional or unconditional) and function call return instructions may be resolved within a given amount of time. In various embodiments, the given amount of time is a single clock cycle. When the target address of an exit point of a basic block can be resolved within the given amount of time, the target address may be considered to be known. Similarly, the target address of the last instruction in the fetched group of instructions 200, such as the non-branch instruction corresponding to the instruction offset 15 in the instruction offset field 210, does not have an exit point from a basic block within the fetched group of instructions 200. Rather, the exit point for this instruction is the fall through to the next fetch group of instructions. The target address for this non-branch instruction is the next fetch address, which is shown as the sum of the fetch address 205, the offset 15 and an increment of 1. This target address may be resolved within the given amount of time, such as a single clock cycle.

In contrast to the above instructions, the target address for an indirect branch instruction (conditional or unconditional) may not be resolved within the given amount of time. For example, an access of the working register file may consume more than the given amount of time, such as a single clock cycle. Therefore, the target address for an indirect branch instruction (conditional or unconditional) may be considered to be unknown.

The scan-on-fill target predictor may scan the fetched group of instructions 200 and determine whether to store information for one or more instructions for later next fetch predictions. For example, the scan-on-fill target predictor may identify instructions that are entry points to basic blocks that have an exit point with a target address that can be resolved within a given amount of time. For example, the non-branch instruction corresponding to the instruction offset 4 in the instruction offset field 210 is an entry point to a basic block. In addition, the exit point, which is the conditional direct branch instruction corresponding to instruction offset 7 in field 210. This direct branch instruction has a target address denoted as Target-A, which can be resolved within the given amount of time. Therefore, the scan-on-fill target predictor may store the address of the non-branch instruction, which is the sum of 0x4A8 and the offset 4 or 0x04AC. In addition, the scan-on-fill target predictor may store the target address Target-A to be used for later next fetch predictions. At a later time, when the instruction fetch unit sends the fetch address 0x04AC to the instruction cache, the scan-on-fill target predictor may provide the Target-A as a next fetch prediction to the instruction fetch unit.

In a similar manner, scan-on-fill target predictor may store the address of the non-branch instruction corresponding to the instruction offset 8, which is the sum of 0x4A8 and the offset 8 or 0x04B0. In addition, the scan-on-fill target predictor may store the target address Target-B to be used for later next fetch predictions. At a later time, when the instruction fetch unit sends the fetch address 0x04B0 to the instruction cache, the scan-on-fill target predictor may provide the Target-B as a next fetch prediction to the instruction fetch unit.

The scan-on-fill target predictor may also store the address of the non-branch instruction corresponding to the instruction offset 12, which is the sum of 0x4A8 and the offset 12 or 0x04B4. In addition, the scan-on-fill target predictor may store an indication of the target address indicating the return address stack stores the target address. At a later time, when the instruction fetch unit sends the fetch address 0x04B4 to the instruction cache, the scan-on-fill target predictor may provide the indication that the return address stack stores the target address as a next fetch prediction to the instruction fetch unit.

It is noted that while FIG. 2 shows a Target Address Indication (field 225) that shows a target address for conditional direct branches, in various embodiments the actual target also depends on the taken/not-taken status of those branches. In some embodiments, it may be assumed that all conditional branches are taken. However, in other embodiments, it may be assumed that all conditional branches as not-taken. For example, in such an embodiment the Target-A and Target-B entries in FIG. 2 would all become 'RAS pop' as the exit would be at the call-return. These and other embodiments are possible and are contemplated.

Figure 3:
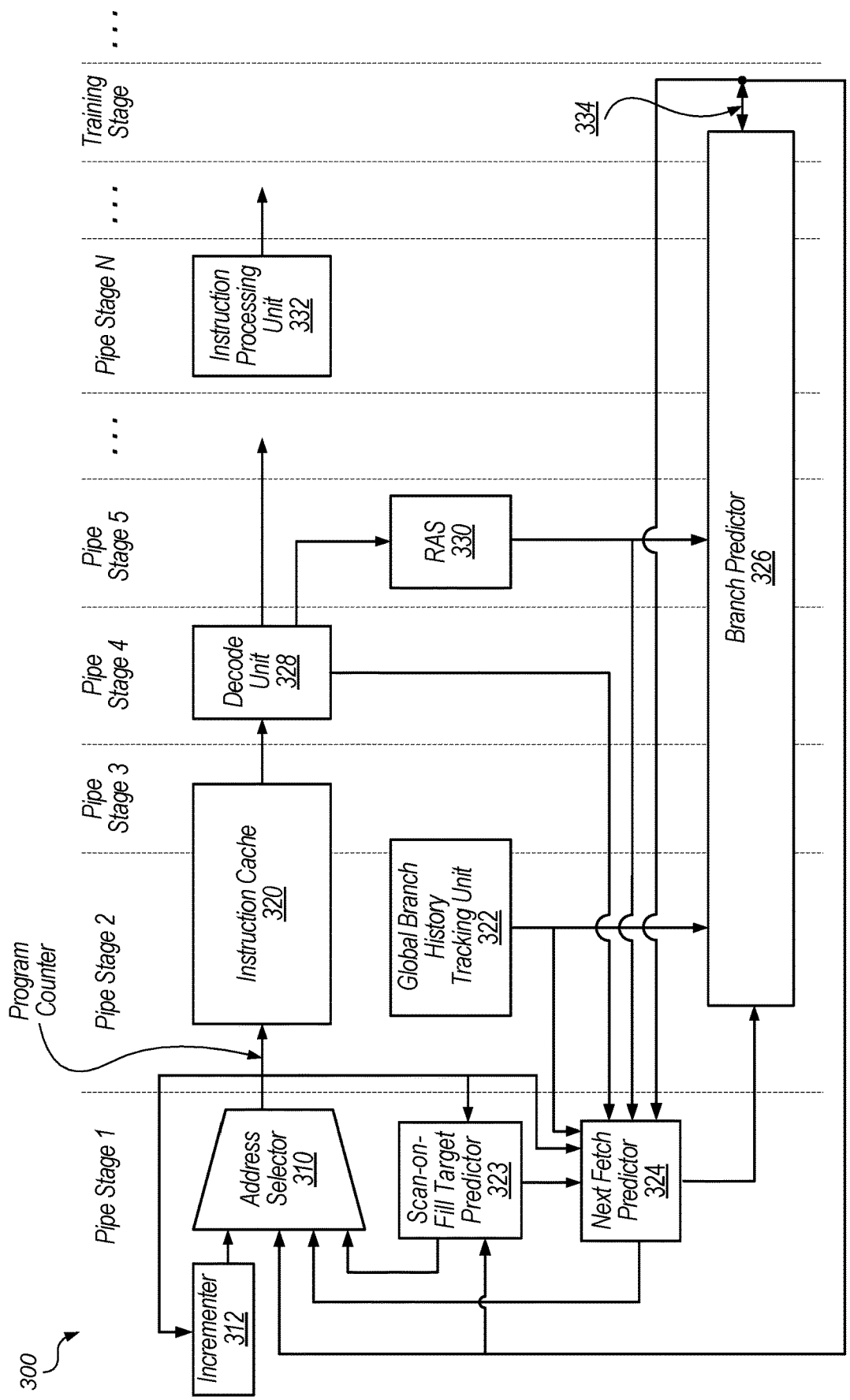
FIG. 3 is a block diagram of one embodiment of a front-end pipeline of a front-end pipeline of a processor.

Referring to FIG. 3, a generalized block diagram illustrating one embodiment of a front-end pipeline 300 of a processor is shown. In the embodiment shown, pipeline 300 is a multi-stage pipeline for the processing of instructions. A processor "pipeline" may be used to split the "work" a processor performs on instructions into multiple stages. In one embodiment, instruction decode, dispatch, execution, and retirement may be examples of different pipeline stages. Various pipeline stages perform such steps on an instruction during one or more processor clock cycles and then pass the instruction and/or operations associated with the instruction on to other stages for further processing. Many different pipeline architectures are possible with varying orderings of elements. In one embodiment, pipeline 300 may be included in the processor core 100 (of FIG. 1). It is also noted that the ordering of pipeline stages in FIG. 3 is intended to be representative of one embodiment and not to exclude other implementations.

An instruction cache 320 may store instructions for a software application (e.g., a user application, operating system) executing on the processor. One or more instructions indicated by a program counter (PC) address conveyed by the address selector 310 are fetched (i.e., retrieved) from the instruction cache 320. Multiple instructions may be fetched from the instruction cache 320 per clock cycle if there are no instruction cache misses (i.e., the requested instructions are currently located in instruction cache 320). In certain embodiments, the processor may implement an address translation scheme allowing one or more virtual address spaces to be made visible to executing software. Memory accesses within the virtual address space may be translated to a physical address space corresponding to the actual physical memory available to the processor. In embodiments of processors that employ address translation, instruction cache 320 may be partially or completely addressed using physical address bits rather than virtual address bits. For example, in one embodiment, instruction cache 320 may use virtual address bits for cache indexing and physical address bits for cache tags. In order to avoid the cost of performing a full memory translation when performing a cache access, the processor may store a set of recent and/or frequently used virtual-to-physical address translations in a translation lookaside buffer (TLB), which is not shown in FIG. 3.

In the embodiment shown, the current fetch address supplied to instruction cache 320 comes from address selector 310. In this particular implementation, selector 310 receives four different inputs (other numbers of inputs are possible depending on the embodiment). One input to selector 310 is supplied by incrementer 312, which supplies a next sequential PC address for the next fetch group (i.e., the next PC for the next fetch group assuming there is not a taken branch in the current fetch group). Other inputs are supplied to selector 310 by scan-on-fill target predictor 323, next fetch predictor 324 and branch predictor 326. As can be seen from the depiction of pipeline stages in FIG. 3, each of scan-on-fill target predictor 323 and next fetch predictor 324 generates an address prediction prior to predictions generated by branch predictor 326.

In one embodiment, each of scan-on-fill target predictor 323 and next fetch predictor 324 generates a non-sequential PC address based on a prediction for a given branch or other control transfer instruction in the current fetch group. Each of scan-on-fill target predictor 323 and next fetch predictor 324 may generate the PC address relatively faster than a corresponding prediction for the given branch instruction that is made by branch predictor 326. In some embodiments, next fetch predictor 324 may access branch prediction information based on the PC address of the current fetch group and/or global branch history data supplied by global branch history tracking unit 322. On the other hand, scan-on-fill target predictor 323 may not access this information.

In one embodiment, next fetch predictor 324 includes a table with multiple entries, with each entry storing at least a current fetch address (or a portion thereof), global branch history data, and a prediction of the next fetch address. Next fetch predictor 324 may perform a lookup of the table using the current fetch address and if the lookup results in a single matching entry, then next fetch predictor 324 may convey the prediction of the next fetch address from the matching entry to address selector 310. If the lookup results in multiple matching entries, then next fetch predictor 324 may utilize the global branch history data to find a single match among the multiple matching entries. Next fetch predictor 324 may then utilize the prediction from the entry that matches both the current fetch address and the global branch history data. It is noted that when a single matching entry is found based on a lookup of the current fetch address, the global branch history data of the entry may not match the current global branch history data supplied by global branch history tracking unit 322. However, next fetch predictor 324 may ignore the global branch history data field when a single matching entry is found for a lookup of the current fetch address.

In various embodiments, scan-on-fill target predictor 323 includes a table with multiple entries, with each entry storing at least a current fetch address (or a portion thereof) and a prediction of the next fetch address. Scan-on-fill target predictor 323 may perform a lookup of the table using the current fetch address. If the lookup results in a matching entry, then scan-on-fill target predictor 323 may convey the prediction of the next fetch address from the matching entry to address selector 310. The address selector 310 may use higher priority for the prediction of the next fetch address from next fetch predictor 324 than for the prediction from scan-on-fill target predictor 323. When next fetch predictor 324 does not provide a prediction, but scan-on-fill target predictor 323 does provide a prediction, the address selector 310 may select the prediction from scan-on-fill target predictor 323 as the next fetch address.

In another embodiment, the processor 300 includes selection logic prior to address selector 310 which selects between predictions from next fetch predictor 324 and scan-on-fill target predictor 323. When each of next fetch predictor 324 and scan-on-fill target predictor 323 provide a prediction for the next fetch address, this selection logic may select the prediction from next fetch predictor 324. Therefore, only a single prediction is provided to address selector 310. When next fetch predictor 324 does not provide a prediction, but scan-on-fill target predictor 323 does provide a prediction, the prediction from scan-on-fill target predictor 323 is provided to address selector 310.

In one embodiment, branch predictor 326 may receive at least a portion of the PC address used to fetch instructions from the instruction cache 320. Using this and other information, branch predictor 326 may perform a prediction of the direction and target of a branch instruction that was predicted by one or more of next fetch predictor 324 and scan-on-fill target predictor 323. The prediction of branch predictor 326 may, in many embodiments, be relatively slower (and thus more accurate) than the prediction generated by next fetch predictor 324 and scan-on-fill target predictor 323. For instance, branch predictor 326 may combine, in a separate hash function, at least a portion of the received PC address with another portion of itself or with other values, such as history information provided by global branch history tracking unit 322. Various hashing functions may be performed to determine an index to one or more pattern history tables (PHTs), branch target buffers (BTBs), and/or other tables used to provide branch prediction data 334. The branch prediction data 334 may include a branch direction and a branch target address. The branch predictor 326 may utilize multiple clock cycles to both determine the outcome of the condition of a branch instruction and to determine the branch target address.

The branch predictor 326 may thus provide branch prediction data 334 with higher prediction accuracy than next fetch predictor 324 and scan-on-fill target predictor 323. For performance reasons, however, it may be desirable to obtain a faster prediction. Therefore, the next fetch predictor 324 and scan-on-fill target predictor 323 may be used to provide a quick, initial branch prediction. In the illustrated embodiment, each of next fetch predictor 324 and scan-on-fill target predictor 323 provides a predicted next address to instruction cache 320 through address selector 310. In other embodiments, each of next fetch predictor 324 and scan-on-fill target predictor 323 provides predicted fetch address to instruction cache 320 through other communication paths. The branch predictor 326 may perform a parallel, slower branch prediction, which may or may not confirm the prediction generated by next fetch predictor 324.

In one embodiment, the prediction data generated by next fetch predictor 324 and scan-on-fill target predictor 323 is stored and staged along the pipeline so as to be made available to various pipeline stages. The staged prediction data may be compared to prediction data generated at a later pipeline stage by the branch predictor 326 or completion data generated from execution and completion of branch instructions. When the next fetch predictor 324 generates branch prediction data that does not match prediction data 334 generated by the branch predictor 326 at a later time, the next fetch predictor 324 may be updated or trained with the prediction data 334 generated by the branch predictor 326 (e.g., during the training stage of FIG. 3). Next fetch predictor 324 may be similarly trained at retirement or completion of relevant instructions. Note that the training stage may precede pipeline stage N in some embodiments.

When next fetch predictor 324 does not generate branch prediction data and scan-on-fill target predictor 323 generates branch prediction data that is selected for use, but the generated branch prediction data does not match prediction data 334 generated by the branch predictor 326 at a later time, the corresponding table entry in scan-on-fill target predictor 323 is invalidated. However, when next fetch predictor 324 does not generate branch prediction data and scan-on-fill target predictor 323 generates branch prediction data that is selected for use and the generated branch prediction data matches prediction data 334 generated by the branch predictor 326 at a later time, the stored information in the corresponding table entry in scan-on-fill target predictor 323 is sent to next fetch predictor 324. Upon sending the stored information, scan-on-fill target predictor 323 may invalidate the corresponding table entry.

When the scan-on-fill target predictor 323 determines a group of instructions is used to fill the instruction cache 320 and the group of instructions is not currently being retrieved from the instruction cache 320 to be processed by other pipeline stages of the processor 300, scan-on-fill target predictor 323 may scan the group of instructions to identify control transfer instructions within the group. In order to allocate a table entry in scan-on-fill target predictor 323 for a given instruction in the group, scan-on-fill target predictor 323 may determine the given instruction is an entry point for a basic block with an exit point with a target address able to be resolved within a given amount of time. In some embodiments, the given amount of time is a single clock cycle. Scan-on-fill target predictor 323 may store the PC of the given instruction that is the entry point of the basic block in the allocated table entry in addition to an indication of the target address of the exit point of the basic block.

Decode unit 328 may, in one embodiment, decode the opcodes of the multiple fetched instructions. Decode unit 328 may send the instructions with additional decoded information to other components in the processor for instruction processing in later pipeline stages. These later pipeline stages are generically represented by instruction processing unit 332. For example, the decode unit 328 may allocate entries in a dispatch queue. Register renaming, instruction scheduling, executing arithmetic operations and/ or performing memory accesses, and in-order retiring are just some examples of later instruction processing steps. In one embodiment, decode unit 328 may forward data to a later pipeline stage while bypassing other pipeline stages. For example, decode unit 328 may decode branch instructions and forward decoded instruction information to next fetch predictor 324 and/or branch predictor 326.

In one embodiment, return address stack (RAS) 330 may be configured to store return addresses for call instructions that are encountered in the instruction stream. When a first call instruction is encountered, the return address associated with the first call instruction is pushed onto RAS 330. If more call instructions are encountered, the corresponding return addresses are pushed onto RAS 330. When a return instruction is encountered, a return address is popped from the top of RAS 330 and used as the location from which to fetch new instructions for the instruction stream. One or more return addresses from main RAS 330 may be coupled back to next fetch predictor 324 and scan-on-fill target predictor 323.

Global branch history tracking unit 322 may be configured to track the global branch history of instructions executed by the host processor. Global branch history tracking unit 322 may use any of various techniques for monitoring and storing history data associated with the branches being executed by the processor. For example, in one embodiment, global branch history tracking unit 322 may track the taken/not-taken status of each branch being fetched and executed by the processor. The taken/not-taken status may be encoded with a '1' for taken and a '0' for not taken. In another embodiment, global branch history tracking unit 322 may track the taken/not-taken status of each branch and the target of each taken branch. Global branch history tracking unit 322 may encode the data into a combined bit stream and then provide this bit stream (or a portion thereof) to next fetch predictor 324 and branch predictor 326. Other techniques for tracking and storing branch history data by global branch history tracking unit 322 are possible and are contemplated.

Figure 4:
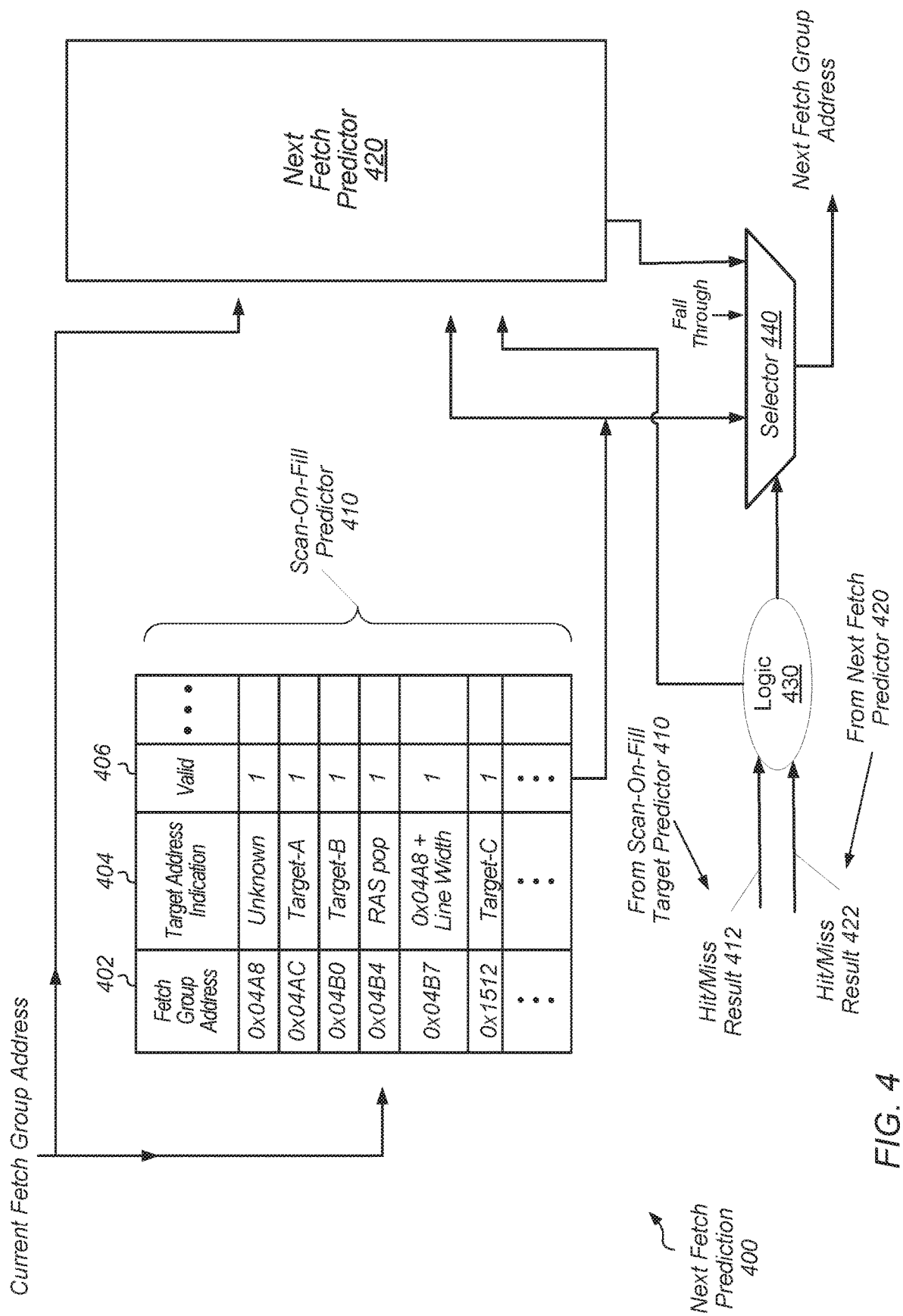
FIG. 4 illustrates one embodiment of a scan-on-fill target predictor for use in performing next fetch prediction.

Turning now to FIG. 4, one embodiment of a scan-on-fill target predictor 410 for use in performing next fetch prediction 400 is shown. Scan-on-fill target predictor 410 may include a table with multiple entries populated with at least fields 402-406. Access logic, read and write lines, decoders and so forth within scan-on-fill target predictor 410 are not shown for ease of illustration. In various embodiments, the field 402 is used to store a current fetch address at a time the table entry is allocated. The fetch address may correspond to a non-branch instruction that is also an entry point to a basic block.

In one embodiment, the field 404 is used to store an indication of a target address. The indication of the target address may indicate the target address of a branch instruction that is also an exit point of the basic block. The corresponding table entry may be allocated when the indication of the target address may be resolved within a given amount of time. In various embodiments, the given amount of time is a single clock cycle.

In some embodiments, the indication of the target address may be an actual address of a next fetch group. For example, the indication of the target address is the contents of the program counter (PC) summed with an address offset encoded in a direct branch instruction that is the exit point of the basic block. In other embodiments, the indication of the target address may indicate the contents of the return address stack (RAS) is the target address. The actual target address may not be stored in the field 404. Rather, an encoding that indicates the RAS has the target address may be stored. In other embodiments, the actual target address is read from the RAS and stored in field 404.

The field 406 may store an indication of whether the corresponding table entry stores valid information to use for next fetch prediction. The number of table entries in scan-on-fill target predictor 410 may vary according to the embodiment. Nevertheless, by using the techniques described herein, the number of table entries may be minimized, allowing for a reduction in power consumption during each lookup of the table in scan-on-fill target predictor 410 and a reduction in the area used for implementing scan-on-fill target predictor 410.

Next fetch predictor 420 may also include one or more tables. The table entries in next fetch predictor 420 may store a fetch address, branch history data, a next fetch address, an indication of a fetch width, and so on. Although, next fetch predictor 420 has less logic and less storage area in data structures, such as the one or more tables, than a branch predictor, next fetch predictor 420 may have more logic and storage area than scan-on-fill target predictor 410.

The next fetch address is typically generated before any instruction data is received from the previous instruction fetch. In addition, the predicted next fetch address is needed within a single clock cycle for the next fetch operation. Therefore, predictions for next fetch addresses are typically generated from stored information corresponding to a history of fetch addresses. Next fetch prediction 400 may be used to provide a prediction for the next fetch address based on the current fetch address. Typically, the prediction is provided within a single clock cycle.

Next fetch predictor 420 is typically trained by the branch predictor providing predictions for the branch direction and the branch target address. The branch predictor has significantly more time and information to perform these predictions at a later pipeline stage. In order to provide relatively fast next fetch predictions, each of next fetch predictor 420 and scan-on-fill target predictor 410 has relatively limited storage area and simpler logic compared with the branch predictor. Due to relatively limited storage area in next fetch predictor 420, program flow information for control transfer instructions that have not been recently executed is unlikely to be present in next fetch predictor 420. Therefore, a successful instruction prefetch provided by next fetch predictor 420 may be followed by a next fetch misprediction as the corresponding information is no longer stored in next fetch predictor 420. The subsequent misprediction can negatively impact the overall processor performance.

Scan-on-fill target predictor 410 may extract program flow information for control transfer instructions from a group of instructions currently filling the instruction cache. The group of instructions may correspond to a newly filled instruction cache line. To extract the information, scan-on-fill target predictor 410 may scan the group of instructions and the information may be later used for a next fetch prediction in the absence of a prediction based on stored history in next fetch predictor 420. When scan-on-fill target predictor 410 determines a group of instructions is used to fill the instruction cache and the group of instructions is not currently being retrieved from the instruction cache to be processed by other pipeline stages of the processor, such as in a fill forward operation, the scan-on-fill target predictor 410 may scan the group of instructions to identify control transfer instructions within the group.

In order to allocate a table entry in scan-on-fill target predictor 410 for a given instruction in the group, the scan-on-fill target predictor 410 determines the given instruction is an entry point in a basic block with an exit point with a target address able to be resolved within a given amount of time, such as a single clock cycle. In various embodiments, the current fetch address is sent from an instruction fetch unit to an instruction cache. Additionally, the current fetch address (or a portion thereof) is sent to each of scan-on-fill target predictor 410 and next fetch predictor 420.

In various embodiments, each of scan-on-fill target predictor 410 and next fetch predictor 420 performs a lookup into respective tables. For example, scan-on-fill target predictor 410 may perform a lookup of column 402 using the current fetch address (or a portion thereof). In various embodiments, column 402 may be implemented as content-addressable-memory (CAM) field to facilitate efficient searches.

In various embodiments, next fetch predictor 420 has higher priority than scan-on-fill target predictor 410. In such embodiments, if the lookup in next fetch predictor 420 results in a hit, which is indicated by hit/miss result 422, and a prediction is sent from next fetch predictor 420 to the selector 440, then the prediction from next fetch predictor 420 is selected to be conveyed to the instruction fetch unit. For example, in some embodiments, the control logic 430 receives hit/miss result 412 from scan-on-fill target predictor 410 and hit/miss result 422 from next fetch predictor 420 to select the appropriate prediction for the next fetch address. In some embodiments, control logic 430 uses a higher priority value for predictions from next fetch predictor 420 than for scan-on-fill target predictor 410.

The control logic 430 may generate a select signal for the selector 440, which may be implemented as a multiplexer, to select the appropriate prediction for the next fetch address. The instruction fetch unit may use the selected prediction as the next fetch address. In addition, next fetch predictor 420 may send a predicted fetch width, whereas scan-on-fill target predictor 410 does not include this information.

If the lookup in the next fetch predictor 420 results in a miss, but the lookup in the scan-on-fill target predictor 410 results in a hit, then the prediction from the hit entry in scan-on-fill target predictor 410 may be selected by control logic 430 and selector 440 to be conveyed to the instruction fetch unit. If the lookup in the next fetch predictor 420 results in a miss and the lookup in scan-on-fill target predictor 410 results in a miss, then the control logic 430 and the selector 440 may select a fall through address as the next fetch address. The fall through address may be the current fetch address summed with an instruction fetch width and one to point to a next group of instructions, such as a next contiguous instruction cache line.

Figure 5:
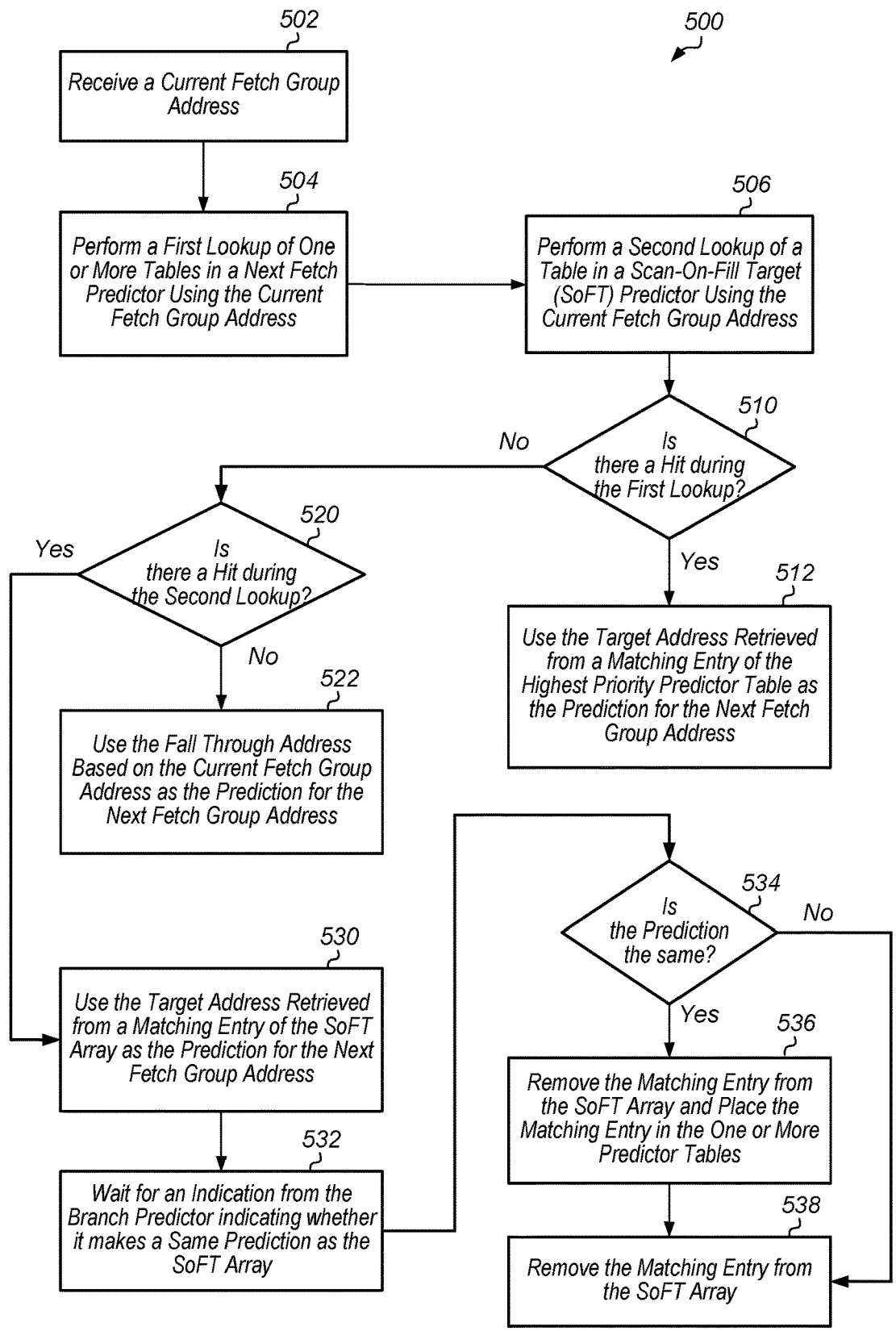
FIG. 5 is a generalized flow diagram illustrating one embodiment of a method for generating a prediction of a next fetch address.

Referring now to FIG. 5, one embodiment of a method 500 for generating a prediction of a next fetch address is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 500.

A scan-on-fill target predictor may receive a current fetch address (block 502). In addition, a next fetch predictor of the processor may receive the current fetch address. In various embodiments, the processor may be included within a host device, wherein the host device is a smartphone, tablet, laptop computer, desktop computer, watch, server, programmable consumer electronic device, set-top box, television, satellite receiver, or other electronic device or computing system. The next fetch predictor may perform a first lookup of one or more next fetch address prediction tables using the current fetch address (block 504). The scan-on-fill target predictor may perform a second lookup of a next fetch address prediction table using the current fetch address (block 506). Although the first lookup and the second lookup are shown as serial steps, the lookup operations may occur concurrently.

If the first lookup results in a hit (conditional block 510, "yes" leg), then the next fetch address retrieved from a matching entry in the one or more tables of next fetch predictor with the highest priority is selected as the prediction for the next fetch address to send to the instruction fetch unit. If the first lookup results in a miss (conditional block 510, "no" leg), and the second lookup results in a miss (conditional block 520, "no" leg), then the fall through address is selected as the prediction for the next fetch address to send to the instruction fetch unit (block 522). The fall through address may be the current fetch address summed with an instruction fetch width and one to point to a next group of instructions, such as a next contiguous instruction cache line.

If the first lookup results in a miss (conditional block 510, "no" leg), but the second lookup results in a hit (conditional block 520, "yes" leg), then the indication of the target address retrieved from the matching table entry of the scan-on-fill target predictor is selected as the prediction for the next fetch address to send to the instruction fetch unit (block 530). The scan-on-fill target predictor may not take further action with the matching table entry until it receives feedback from the branch predictor. For example, the scan-on-fill target predictor may wait for an indication from the branch predictor indicating whether the branch predictor makes a same prediction for the next fetch address (block 532).

If the prediction is not the same (conditional block 534, "no" leg), then the matching table entry is invalidated (block 538). If the prediction is the same (conditional block 534, "yes" leg), then the information stored in the matching table entry is sent for storage in the next fetch predictor (block 536). In addition, the matching table entry is invalidated. Table entries in the scan-on-fill target predictor may be further invalidated by a least recently used (LRU) replacement algorithm when no table entries are available for a new allocation.

Figure 6:
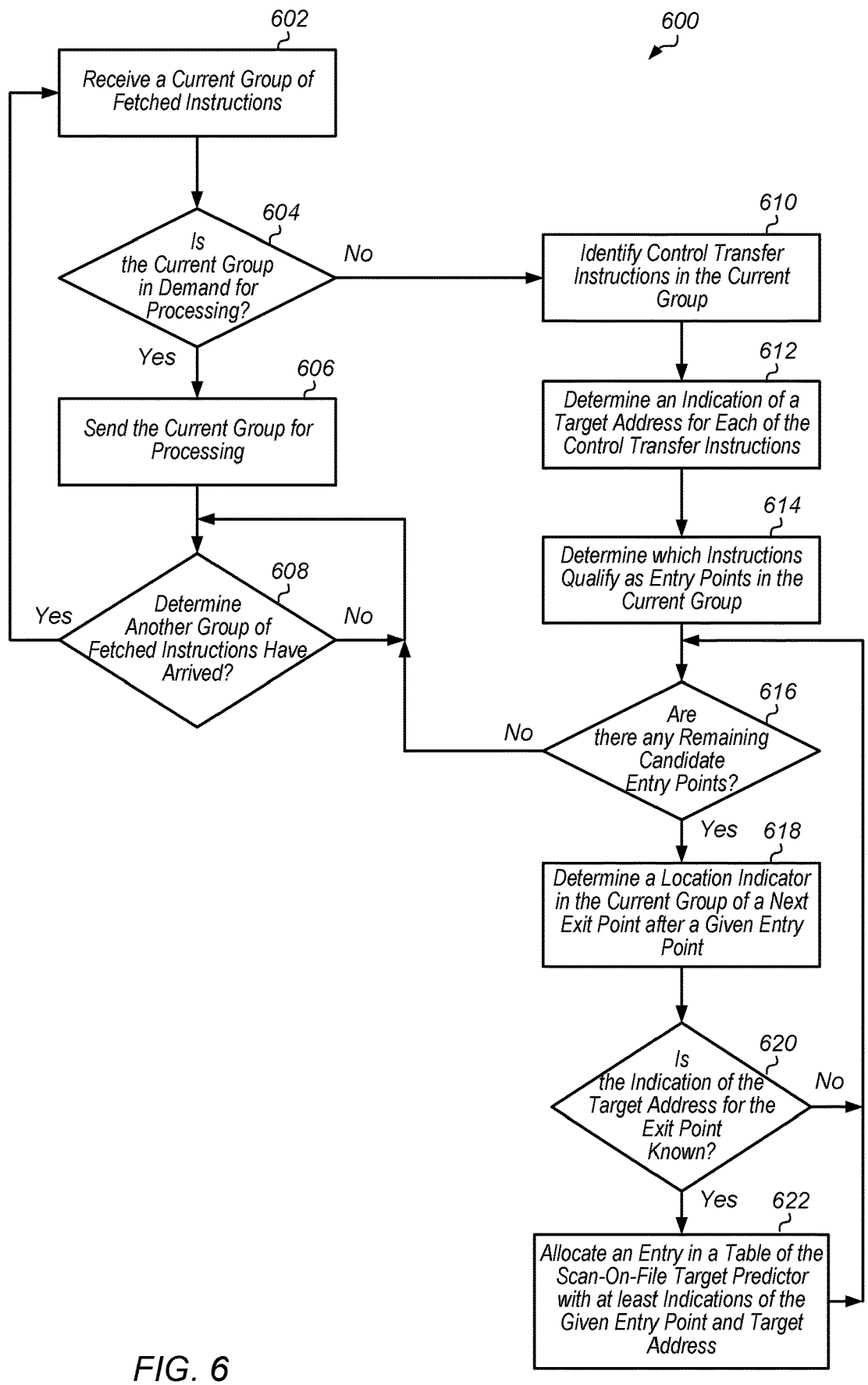
FIG. 6 is a generalized flow diagram illustrating another embodiment of a method for allocating a table in a scan-on-fill target predictor.

Turning now to FIG. 6, one embodiment of another method 600 for allocating a table in a scan-on-fill target predictor is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 600.

A processor may receive a current group of fetched instructions (block 602). The current group of fetched instructions may correspond to a current fetched instruction cache line. The current group of fetched instructions may be used to fill an instruction cache line. In addition, for a fill forward operation, the current group of fetched instructions may be sent to another pipeline stage of the processor for immediate processing. In such a case, the current group of fetched instructions may be considered to be in demand. If the current group of fetched instructions in demand for processing (conditional block 604, "yes" leg), then the current group of fetched instructions is sent for processing (block 606). If another group of fetched instructions have not yet arrived (conditional block 608, "no" leg), then the processor may wait for another group. However, if another group of fetched instructions have arrived (conditional block 608, "yes" leg), then control flow of method 600 returns to block 602.

If the current group of fetched instructions is not in demand for processing, but only being used to fill an instruction cache line rather than being additionally used for immediately processing (conditional block 604, "no" leg), then a scan-on-fill target predictor in the processor scans the group of fetched instructions and identifies one or more control transfer instructions (block 610). The scan-on-fill target predictor may use the identified control transfer instructions to further identify entry points to basic blocks where the control transfer instructions are exit points for the basic blocks.

The scan-on-fill target predictor determines an indication of a target address for each of the identified control transfer instructions (block 612). For a direct branch instruction (conditional or unconditional), the target address is the contents of the program counter (PC) for the direct branch instruction summed with an address offset encoded in the direct branch instruction. For a function call return instruction, the target address is the contents of the return address stack (RAS). For an indirect branch instruction, the target address is the contents of a register in the working register file where the register is encoded in the indirect branch instruction. For direct branch instructions and function call return instructions, the target address may be resolved within a given amount of time, such as a single clock cycle.

The scan-on-fill target predictor determines which instructions in the fetched group of instructions qualify as entry points to basic blocks (block 614). The instructions immediately following the identified control transfer instructions may qualify. In addition, the first instruction of the fetched group of instructions may qualify if it is a non-branch instruction. If there are no remaining candidate entry points in the fetched group of instructions (conditional block 616, "no" leg), then control flow of method 600 returns to conditional block 608. If there are remaining candidate entry points in the fetched group of instructions (conditional block 616, "yes" leg), then the scan-on-fill target predictor determines a location indicator of a next exit point after a given entry point (block 618). For example, an instruction offset of a next control transfer instruction after the given entry point may be identified.

If the indication of the target address for the identified exit point is unknown, such as the target address is unable to be resolved within a given amount of time (conditional block 620, "no" leg), then control flow of method 600 returns to conditional block 616. However, if the indication of the target address for the identified exit point is known (conditional block 620, "yes" leg), then the scan-on-file target predictor may allocate an entry in a corresponding table. The allocated entry may store at least the fetch address of the instruction at the entry point and the indication of the target address for the exit point.

Figure 7:
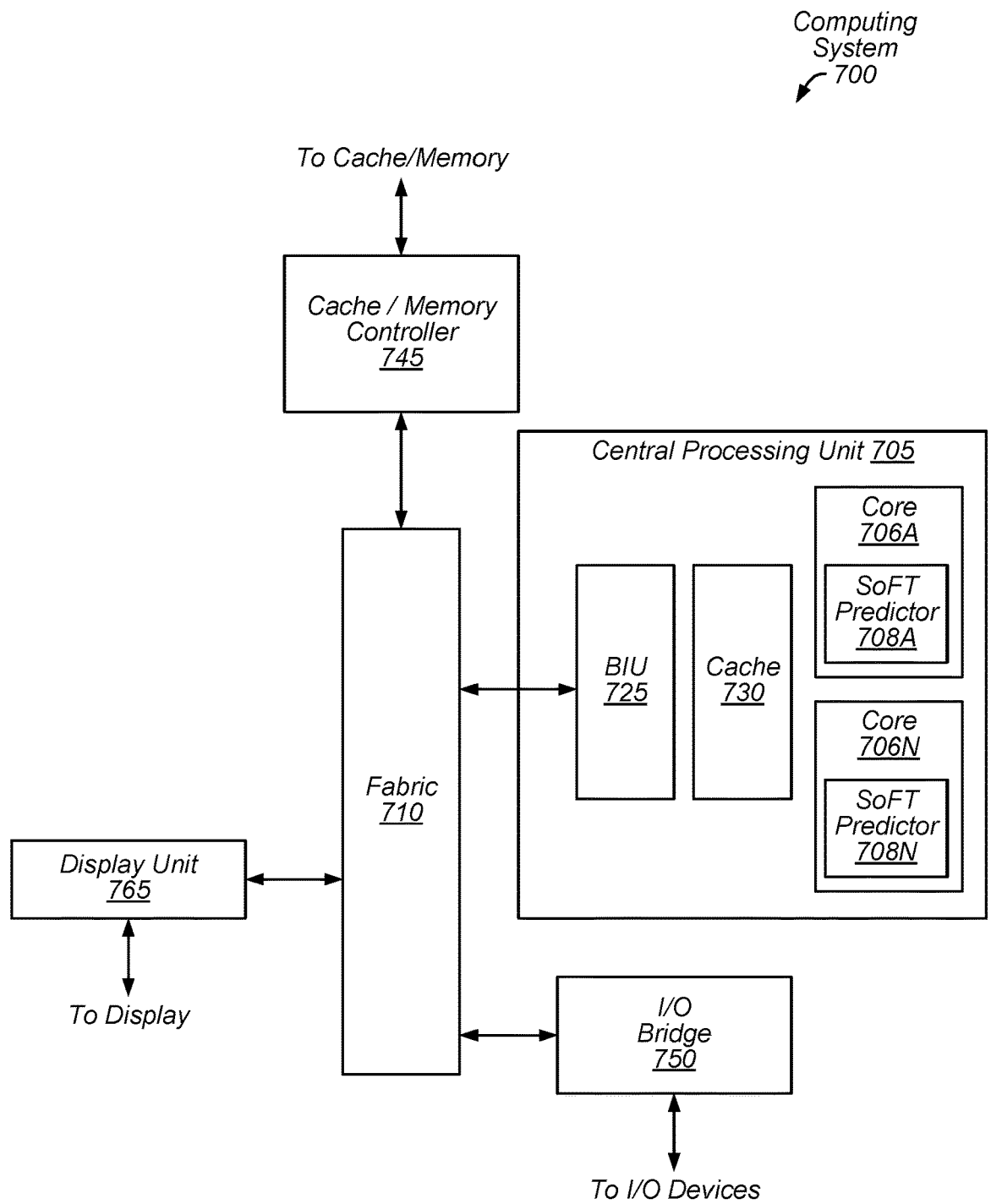
FIG. 7 is a generalized flow diagram illustrating one embodiment of a computing system.

Referring now to FIG. 7, a block diagram illustrating one embodiment of a computing system 700 is shown. In some embodiments, some or all elements of the computing system 700 may be included within a system on a chip (SoC). In some embodiments, computing system 700 may be included in a mobile device. In the illustrated embodiment, the computing system 700 includes fabric 710, central processing unit (CPU) 705, input/output (I/O) bridge 750, cache/memory controller 745, and display unit 765. Although the computing system 700 illustrates central processing unit 705 as being connected to fabric 710 as a sole central processing unit of the computing system 700, in other embodiments, central processing unit 705 may be connected to or included in other components of the computing system 700. Additionally or alternatively, the computing system 700 may include multiple central processing units 705. The multiple central processing units 705 may include different units or equivalent units, depending on the embodiment.

Fabric 710 may include various interconnects, buses, MUXes, controllers, etc., and may be configured to facilitate communication between various elements of computing system 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, central processing unit 705 includes bus interface unit (BIU) 725, cache 730, and cores 706A and 706N. In various embodiments, central processing unit 705 may include various numbers of cores and/or caches. For example, central processing unit 705 may include 1, 2, or 4 processor cores, or any other suitable number. In some embodiments, cores 706A and/or 706N include internal instruction and/or data caches. In various embodiments, cores 706A and 706N include respective scan-on-fill target (SoFT) predictors 708A and 708N. SoFT predictors 708A and 708N may be used to provide predictions of next fetch addresses. In some embodiments, a coherency unit (not shown) in fabric 710, cache 730, or elsewhere in computing system 700 may be configured to maintain coherency between various caches of computing system 700. BIU 725 may be configured to manage communication between central processing unit 705 and other elements of computing system 700. Processor cores such as cores 706A and 706N may be configured to execute instructions of a particular instruction set architecture (ISA), which may include operating system instructions and user application instructions.

Cache/memory controller 745 may be configured to manage transfer of data between fabric 710 and one or more caches and/or memories (e.g., non-transitory computer readable mediums). For example, cache/memory controller 745 may be coupled to an L3 cache, which may, in turn, be coupled to a system memory. In other embodiments, cache/memory controller 745 may be directly coupled to a memory. In some embodiments, the cache/memory controller 745 may include one or more internal caches.

Display unit 765 may be configured to read data from a frame buffer and provide a stream of pixel values for display. Display unit 765 may be configured as a display pipeline in some embodiments. Furthermore, display unit 765 may include one or more interfaces (e.g., MIPI® or embedded display port (eDP)) for coupling to a user display (e.g., a touchscreen or an external display). I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 700 via I/O bridge 750. In some embodiments, central processing unit 705 may be coupled to computing system 700 via I/O bridge 750.

It is noted that other embodiments may include other combinations of components, including subsets or supersets of the components shown in FIG. 7 and/or other components. While one instance of a given component may be shown in FIG. 7, other embodiments may include two or more instances of the given component. Similarly, throughout this detailed description, two or more instances of a given component may be included even if only one is shown, and/or embodiments that include only one instance may be used even if multiple instances are shown.

Figure 8:
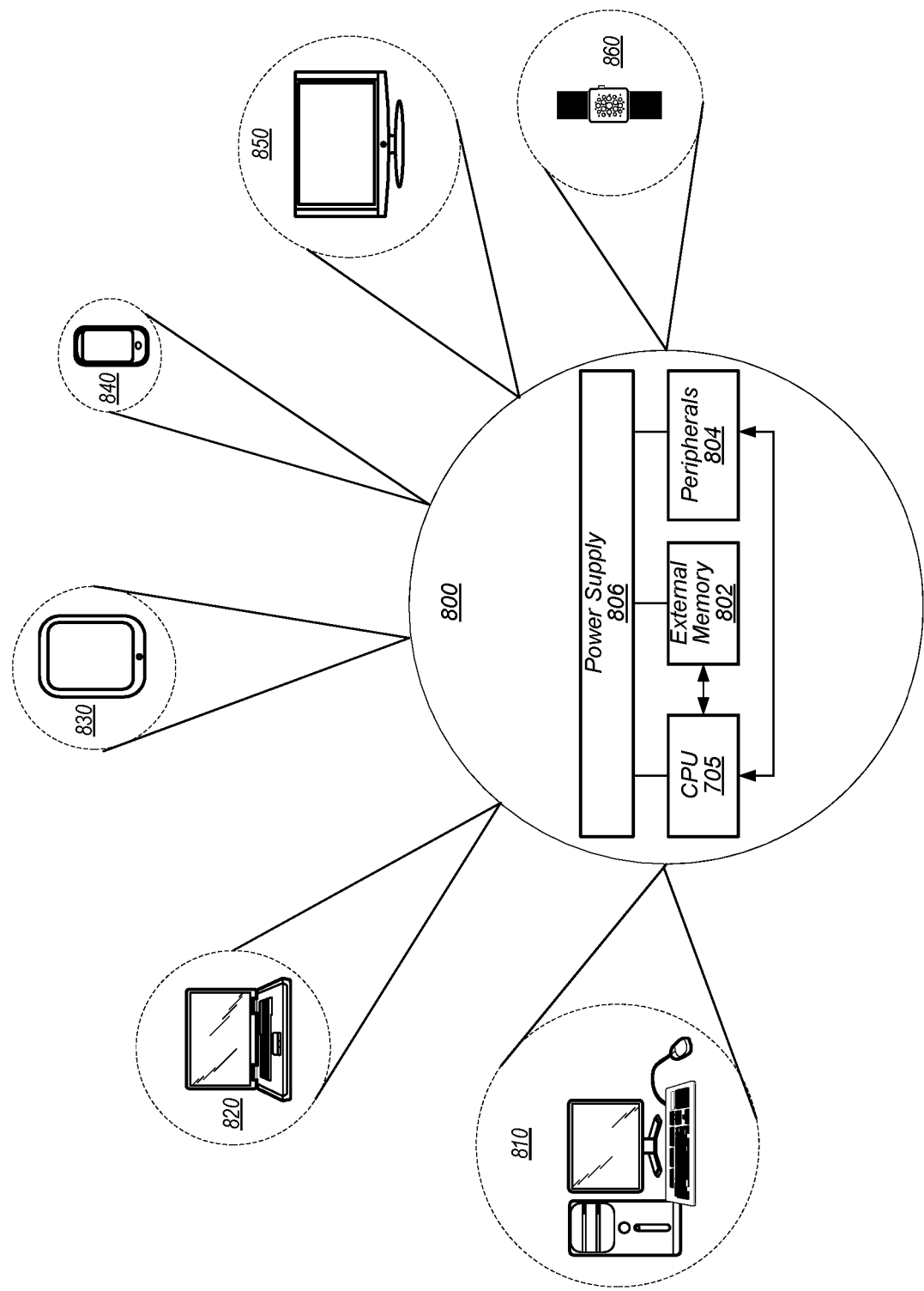
FIG. 8 is a block diagram illustrating one embodiment of a system.

Turning next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of CPU 705 (of FIG. 7) coupled to an external memory 802. In various embodiments, CPU 705 may be included within a system on chip (SoC) or integrated circuit (IC) which is coupled to external memory 802, peripherals 804, and power supply 806.

CPU 705 is coupled to one or more peripherals 804 and the external memory 802. A power supply 806 is also provided which supplies the supply voltages to CPU 705 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of CPU 705 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing CPU 705 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as Wi-Fi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A scan-on-fill target predictor comprising:
an interface configured to receive a current fetch address used by an instruction fetch unit to fetch a first group of instructions from an instruction cache; and
control logic configured to:
scan one or more instructions as they are used to fill the instruction cache;
send an indication of a target address as a next fetch address to an instruction fetch unit responsive to a determination that:
the current fetch address corresponds to a previously detected instruction scanned by the logic as the previously detected instruction was used to fill the instruction cache; and
the previously detected instruction is in a basic block with an exit point that is a control transfer instruction comprising the indication of the target address.

2. The scan-on-fill target predictor as recited in claim 1, wherein to send the indication of the target address, the control logic is further configured to determine the control transfer instruction is a direct branch instruction.

3. The scan-on-fill target predictor as recited in claim 1, wherein the target address is determined by the control logic at a time the first instruction is scanned by the control logic as the first instruction was used to fill the instruction cache.

4. The scan-on-fill target predictor as recited in claim 3, wherein the scan-on-fill target predictor further comprises a first table of entries the store indications of target addresses, and wherein the control logic is further configured to allocate an entry in the first table for a given instruction of the one or more instructions used to fill the instruction cache and a corresponding indication of a target address in response to a determination that the given instruction is in a basic block with an exit point that is a control transfer instruction comprising the indication of the target address.

5. A processor comprising:
an instruction cache configured to store instructions;
an instruction fetch unit configured to use a current fetch address to fetch a first group of instructions from the instruction cache; and
a first predictor configured to:
scan one or more instructions as they are used to fill the instruction cache;
receive the current fetch address used by the instruction fetch unit to fetch the first group of instructions from the instruction cache; and
send an indication of a target address as a next fetch address to the instruction fetch unit responsive to a deteremination that:
the current fetch address corresponds to a first instruction previously scanned by the first predictor as the first instruction was used to fill the instruction cache; and
the first instruction is in a basic block with an exit point that is a control transfer instruction, wherein the exit point comprises the indication of the target address.

6. The processor as recited in claim 5, wherein said determination further comprises a deteremination that said control transfer instruction is a direct branch instruction.

7. The processor as recited in claim 5, wherein the target address is determined by the first predictor at a time the first instruction is scanned by the first predictor as the first instruction was used to fill the instruction cache.

8. The processor as recited in claim 5, wherein the first predictor is further configured to scan the one or more instructions as they are used to fill the instruction cache in further response to a deteremination that the one or more instructions are not currently being retrieved from the instruction cache.

9. The processor as recited in claim 5, wherein the first predictor further comprises a first table of entries that store indications of target addresses, and wherein the first predictor is further configured to allocate an entry in the first table for a given instruction of the one or more instructions used to fill the instruction cache and a corresponding indication of a target address in response to a determination that the given instruction is in a basic block with an exit point that is a control transfer instruction comprising the indication of the target address.

10. The processor as recited in claim 9, wherein the first predictor is further configured to use the received current fetch address to perform a lookup of the first table for the indication of the target address.

11. The processor as recited in claim 10, wherein the processor further comprises control logic and a second predictor comprising a second table of entries that store predictions of next fetch addresses, wherein when the second predictor determines a next fetch address corresponding to the current fetch address, and wherein the control logic is configured to select the next fetch address rather than the indication of the target address from the first predictor for the current fetch address.

12. The processor as recited in claim 11, wherein when the second predictor does not determine a next fetch address corresponding to the current fetch address, the control logic is configured to select the indication of the target address from the first predictor.

13. The processor as recited in claim 11, wherein the processor further comprises a branch predictor configured to determine a next fetch address for the current fetch address after each of the second predictor and the first predictor, wherein in response to receipt of an indication that indicates whether or not the next fetch address from the branch predictor matches the target address, the first predictor is further configured to invalidate an entry in the first table for the first instruction of the first group of instructions and the indication of the target address.

14. The processor as recited in claim 13, in response to a determination that the indication indicates the next fetch address from the branch predictor matches the target address, the first predictor is further configured to send contents of the entry in the first table being invalidated to the second predictor.

15. A method comprising:
storing instructions in an instruction cache;
an instruction fetch unit using a current fetch address to fetch a first group of instructions from the instruction cache;

a first predictor:
  scanning one or more instructions as they are used to fill the instruction cache;
  receiving the current fetch address used by the instruction fetch unit to fetch the first group of instructions from the instruction cache; and
  sending an indication of a target address as a next fetch address to the instruction fetch unit responsive to determining:
    the current fetch address corresponds to a first instruction previously scanned by the first predictor as the first instruction was used to fill the instruction cache; and
    the first instruction is in a basic block with an exit point that is a control transfer instruction, wherein the exit point comprises the indication of the target address.

16. The method as recited in claim 15, wherein said determining further comprises determining said control transfer instruction is a direct branch instruction.

17. The method as recited in claim 15, wherein the target address is determined by the first predictor at a time the first instruction is scanned by the first predictor as the first instruction was used to fill the instruction cache.

18. The method as recited in claim 17, further comprising scanning the one or more instructions as they are used to fill the instruction cache in further response to determining the one or more instructions are not currently being retrieved from the instruction cache.

19. The method as recited in claim 15, further comprising allocating an entry in a first table, wherein the first table comprises entries storing indications of target addresses, for both a given instruction of the one or more instructions used to fill the instruction cache and a corresponding indication of a target address in response to determining the given instruction is in a basic block with an exit point that is a control transfer instruction comprising the indication of the target address.

20. The method as recited in claim 19, further comprising using the received current fetch address to perform a lookup of the first table for the indication of the target address.

* * * * *

UNITED STATES PATENT AND TRADEMARK OFFICE
CERTIFICATE OF CORRECTION

PATENT NO. : 10,747,539 B1
APPLICATION NO. : 15/350486
DATED : August 18, 2020
INVENTOR(S) : Hakewill et al.

Page 1 of 1

It is certified that error appears in the above-identified patent and that said Letters Patent is hereby corrected as shown below:

In the Claims

Column 21, Claim 5, Line 63, please delete "deteremination" and insert -- determination --.

Column 22, Claim 6, Line 6, please delete "deteremination" and insert -- determination --.

Column 22, Claim 8, Line 15, please delete "deteremination" and insert -- determination --.

Signed and Sealed this
Twenty-second Day of December, 2020

Andrei Iancu
*Director of the United States Patent and Trademark Office*